3,812,119
DIBENZOCYCLOHEPTENES

Gordon Northrop Walker, Morristown, N.J., assignor to Ciba-Geigy Corporation, Ardsley, N.Y.
No Drawing. Continuation-in-part of abandoned application Ser. No. 878,914, Nov. 21, 1969. This application Aug. 28, 1970, Ser. No. 68,037
Int. Cl. C07d 87/40
U.S. Cl. 260—247           5 Claims

ABSTRACT OF THE DISCLOSURE 10-(1-aminoalkyl)-10,11-dihydro - 5H - dibenzo[a,d] cycloheptenes, e.g. those of the formula

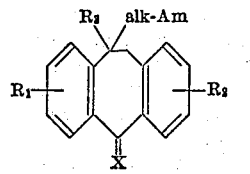

Am=an amino group
alk=lower alkylidene
X=2H, HOH or O
$R_{1,2}$=H, alkyl, alkoxy, alkylmercapto, halo, $CF_3$, $NO_2$ or amino
$R_3$=H, lower alkyl
and salts thereof are antidepressants.

CROSS-REFERENCES TO RELATED APPLICATIONS

This is a continuation-in-part of application Serial No. 878,914, filed Nov. 21, 1969, now abandoned.

SUMMARY OF THE INVENTION

The present invention concerns and has for its object the provision of new 10-(1-aminoalkyl)-10,11-dihydro-5H-dibenzo[a,d]cycloheptenes, preferably of those corresponding to Formula I

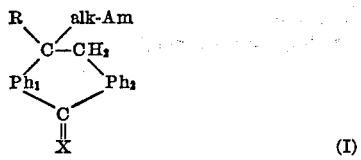

in which each of $Ph_1$ and $Ph_2$ is a 1,2-phenylene radical, R is hydrogen or lower alkyl, alk is lower 1-alkylene, Am is an amino group, and X represents two hydrogen atoms, hydrogen and hydroxy or oxo and salts thereof, and methods for the preparation of said compounds; as well as corresponding pharmaceutical compositions, their preparation and use. The compounds of the invention possess antidepressant activity and are useful, for example, in the treatment or management of exogenous or endogenous depressions.

DESCRIPTION OF THE PREFERRED EMBODIMENT

The 1,2-phenylene radicals $Ph_1$ and $Ph_2$ are unsubstituted or substituted in the remaining 4 positions by one or more than one, preferably by one or two, of the same or different substituents, for example, lower alkyl, e.g. methyl, ethyl, n- or i-propyl or -butyl; etherified or esterified hydroxy or mercapto, such as lower alkoxy or alkylmercapto, e.g. methoxy, ethoxy, n- or i-propoxy or -butoxy, methylmercapto or ethylmercapto, halo, e.g. fluoro, chloro or bromo; trifluoromethyl; nitro; amino or di-lower alkylamino, e.g. dimethylamino or diethylamino. The term "lower," referred to above and hereinafter in connection with organic radicals or compounds respectively, defines such with up to 7, preferably up to 4, carbon atoms.

Preferred radicals $Ph_1$ and $Ph_2$ are above all 1,2-phenylene, but also (lower alkyl)-1,2-phenylene, (lower alkoxy)-1,2-phenylene, (halo)-1,2-phenylene, (trifluoromethyl)-1,2-phenylene, (nitro)-1,2-phenylene or (amino)-1,2-phenylene.

The radical R is preferably hydrogen, but also lower alkyl, such as ethyl, n- or i-propyl or butyl, or above all methyl. The lower 1-alkylene radical alk is preferably methylene, but also 1-ethylene, 1- or 2-propylene or -butylene.

The amino group Am is preferably a tertiary amino group containing advantageously one or two radicals of aliphatic or one of aromatic character. Such amino groups are, for example, lower alkyleneimino or alkenyleneimino, e.g. ethyleneimino, pyrrolidino, pyrrolino, piperidino, 4-phenylpiperidino, 1,4-pentyleneimino, 2,5- or 1,6-hexyleneimino, or 1,7- or 2,6-heptyleneimino, 2-aza-2-bicyclo[2,2,1]heptyl, 2-aza-2-bicyclo[2,2,2] or [3,2,1]octyl, 3-aza-3-bicyclo[3,2,1] or [3,3,0]octyl, 2-aza-2-bicyclo[3,2,2] or [3,3,1]nonyl, 3-aza-3-bicyclo[3,2,2] or [3,3,1]nonyl, 2-aza-2-, 3-aza-3-, 7-aza-7- or 8-aza-8-bicyclo[4,3,0]nonyl or 2-aza-2- or 3-aza-3-bicyclo[4,4,0]decyl, or monocyclic monoaza-, oxa- or -thia-lower alkyleneimino or N-(lower alkyl, hydroxylower alkyl, $HPh_1$-lower alkyl or $HPh_1$)-monoaza-lower alkyleneimino, wherein heteroatoms are separated from each other by at least 2 carbon atoms, e.g. piperazino, 4-(methyl, ethyl, 2-hydroxyethyl, benzyl or phenyl)-piperazino, 3-aza-1,6-hexyleneimino, 3-(methyl or ethyl)-3-aza-1,6-hexyleneimino, 4-aza-1,7-heptyleneimino or 4-(methyl or ethyl)-4-aza-1,7-heptyleneimino, morpholino, 3,5-dimethylmorpholino or thiamorpholino.

The compounds of the invention exhibit valuable pharmacological properties, for example, antidepressant or amphetamine potentiating effects. This can be demonstrated in animal tests, using advantageously mammals, such as mice, rats, or monkeys as test animals. The compounds of the invention can be applied to the animals orally, preferably subcutaneously or intraperitoneally, e.g. in the form of aqueous solutions or suspensions. The dosage may range between about 1 and 500 mg./kg./day, preferably between about 5 and 100 mg./kg./day, advantageously between about 10 and 25 mg./kg./day. A depressant effect is recorded in the mouse jiggle cage test system, where the spontaneous movements of the animals are registered, or an antidepressant effect in the amphetamine test, which is performed as disclosed by P Carlton, Psychopharacologia, 1961, vol. II, p. 364. In accordance with the above procedure, about 8 month old male rats are trained to press a bar every 30 seconds, in order to avoid an electric shock applied through the floor grid. In the case where the animals receive 0.25 mg./kg./day of amphetamine, their performing rate for avoiding said shocks during a test period of about 2½ hours is higher than that of placebo (saline) treated animals. In the case where the animals receive the compounds of the invention in the above-mentioned doses and about 45 minutes later the amphetamine, their rate of avoidance is highest, as compared with that of animals receiving (a) saline alone, (b) saline and amphetamine or (c) the compounds of the invention and saline. Thus, for example, administration of 10-(4-methylpiperazinomethyl)-10,11-dihydro-5H-dibenzo[a,d]cycyoheptene hemihydrate, a characteristic compound of the invention, showed marked antidepressant activity in the amphetamine interaction test at 5 and 10 mg./kg./day, i.p. in male rats. Accordingly, the compounds of the invention are useful antidepressants in the treatment or management of exo- or endogenous depressions, but also useful intermediates in the preparation of other valuable products, especially of pharmacologically active compounds.

Preferred compounds are those of Formula II

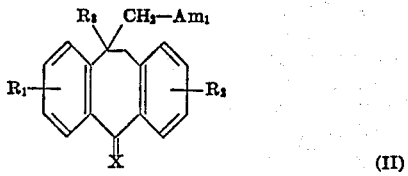

in which each of $R_1$ and $R_2$ is hydrogen, methyl, methoxy, chloro, trifluoromethyl, nitro or amino, $R_3$ is hydrogen or methyl, $Am_1$ is pyrrolidino, piperidino, 4-phenylpiperidino, hexamethyleneimino, piperazino, morpholino or 4-(methyl, ethyl or 2-hydroxyethyl)-piperazino and X represents two hydrogen atoms, or therapeutically acceptable acid addition salts thereof.

Outstanding are compounds of Formula II, in which each of $R_1$, $R_2$ and $R_3$ is hydrogen, $Am_1$ is pyrrolidino, piperidino, 4-phenylpiperidino, piperazino, morpholino or 4-(methyl, ethyl or 2-hydroxyethyl)-piperazino and X is two hydrogen atoms, or therapeutically acceptable acid addition salts thereof.

The compounds of the invention are prepared according to methods known per se. For example, they are obtained by:

(a) Converting in a compound of Formula III

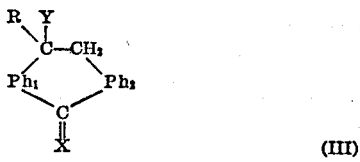

in which Y is a substituent capable of being converted into alk-Am, Y into said aminoalkylidene group, or (b) Opening in a compound of Formula IV

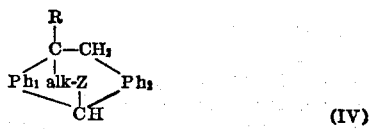

in which Z is a group capable of being converted into Am by hydrogenolysis of the Z-CH bond, Z into Am, or (c) Wherein R is hydrogen, hydrogenating in a compound of Formula V

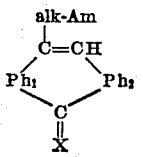

the 10,11-double bond and, if desired, converting any resulting compound into another compound of the invention.

The substituent Y is, for example, a reactively esterified hydroxy-alkylidene group, preferably such derived from a strong inorganic metalloidic acid, particularly a hydrohalic acid, e.g. hydrochloric or hydrobromic acid or sulfuric acid, or an organic sulfonic acid, such as a lower alkane or benzene sulfonic acid, e.g. methane, ethane, benzene or p-toluene sulfonic acid, or a phosphonium-alkylidene group, e.g. a triphenyl-phosphonium halide-alkylidene group. Said groups Y are converted into alk-Am by condensation with H-Am or an alkali metal, e.g. sodium salt thereof.

Another substituent Y is, for example, a (nitro, oximino or imino)-alkylidene group or preferably a cyano or carbamoyl group, e.g. CO-Am, which groups can be converted into alk-Am by reduction. The above nitro compounds, nitriles or amides are advantageously reduced with the use of simple or complex light metal hydrides, such as boron hydride or alkali metal aluminum hydrides, e.g. lithium aluminum hydride. The above oximes or Schiff's bases, i.e. said oximino- or iminoalkylidene compounds, as well as the nitroalkylidene or cyano compounds, can also be reduced with catalytically activated or nascent hydrogen, such as hydrogen in the presence of nickel, platinum or preferably palladium catalysts, or generated electrolytically or by the action of metals on compounds with active hydrogen, such as acids or alcohols, e.g. zinc or iron and inorganic or organic acids, such as hydrohalic or lower alkanoic acids, or sodium or aluminum or their amalgams and lower alkanols.

The ring-opening or hydrogenation processes mentioned under items (b) and (c) are similarly performed as the above-described reduction steps, preferably with the use of catalytically activated hydrogen.

The compounds of the invention so obtained can be converted into each other according to methods known per se. For example, resulting primary, secondary or tertiary amines can be reacted with reactive esters of corresponding alcohols or with corresponding aldehydes or ketones and reducing agents, e.g. formic acid, its functional derivatives or nascent hydrogen, in order to obtain secondary or tertiary amines, or quaternaries respectively. Resulting primary or secondary amines or 5-hydroxy compounds, can also be acylated, for example, with the use of the corresponding acid halides or anhydrides, or acyl derivatives obtained hydrolyzed, e.g. with acids or alkalies, or reduced with simple or complex light metal hydrides. Resulting tertiary amines can be converted into N-oxides or secondary amines, for example by treating them with oxidation or acylating agents, such as hydrogen peroxide or peracids, or acid halides or anhydrides, respectively, e.g. aliphatic or aromatic percarboxylic acids, or haloformic acid esters. Furthermore, nitro groups may be introduced into aromatic moieties, e.g. by the action of nitric-sulfuric acid or by pyrolysis of nitrates, advantageously in acidic media, e.g. intrifluoroacetic acid, or nitro groups present therein reduced, e.g. with nascent hydrogen. A resulting 5-oxo compound can likewise be reduced to the corresponding 5-hydroxy or 5-unsubstituted compound, for example, with the aid of the respective ketone reducing agents, such as complex light metal hydrides, e.g. those mentioned above, metallic alkoxides, e.g. aluminum alkoxides according to Meerwein-Ponndorf-Verley, or catalytically activated or nascent hydrogen. Resulting 5-hydroxy compounds may also be oxidized to the corresponding 5-ketones with the usual alcohol dehydrogenation (oxidation) agents, such as oxygen in the presence of catalysts, e.g. silver, maganese, iron or cobalt catalysts, oxidation agents, such as oxidizing acids or their salts, e.g. hypohalous, periodic, nitric or chromic acid or suitable salts thereof, e.g. sodium hypochlorite, potassium dichromate or permanganate, heavy metal salts or oxides, e.g. chromic, cupric or ferric halides or sulfates or silver, mercuric, vanadium V, chromium VI or manganese IV oxide, in acidic or alkaline media, or according to Oppenauer with the use of metallic alkoxides and simple ketones, e.g. acetone or cyclohexanone. Finally, a resulting basic compound can be converted into a corresponding acid addition salt, for example by reacting it with an inorganic or organic acid, such as a therapeutically useful acid, or with a corresponding anion exchange preparation, and isolating the desired salt. A resulting acid addition salt may be converted into the free compound by treatment with a base, e.g. a metal hydroxide, ammonia or a hydroxyl ion exchange preparation. Therapeutically useful acids are, for example, inorganic or organic acids, such as strong metalloidic acids, for example, a hydrohalic, e.g. hydrochloric or hydrobromic acid, sulfuric, phosphoric, nitric or perchloric acid, or aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, halobenzenesulfonic, toluenesulfonic, naphthalenesulfonic, sulfanilic or cyclohexylsulfamic acid; methionine, tryptophan, lysine or arginine.

These or other salts, for example; the picrates, can also be used for purification of the resulting free compounds, which are converted into salts, the salts separated and the free compounds liberated from the salt. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example, by separation of diastereomeric salts thereof, e.g. by the fractional crystallization of d- or l-tartrates.

The above reactions are carried out according to standard methods, in the presence or absence of diluents, preferably such as are inert to the reagents and are solvents thereof, of catalysts, condensing, neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to those compounds of the invention, which are indicated above as the preferred embodiments of the invention.

The starting material used is known or, if new, may be prepared according to methods known per se. For example, the starting material mentioned under item (a) is prepared by ring-closure of compounds of the formula

in which one of $R_1$ and $R_2$ is hydrogen and the other free or reactively converted carboxy, e.g. chlorocarbonyl, according to the Friedel-Crafts reaction, i.e. the presence of Lewis acids, e.g. polyphosphoric acid or aluminum chloride. Furthermore, when R is alkyl, said radical can be introduced by alkylation of the above ring-closed compounds, for example, with a reactive ester of a lower alkanol, R—OH, such as a lower alkyl halide, e.g. methyl iodide, in the presence of a base, such as a metal hydride, alkoxides or hydroxide, e.g. sodium methoxide, ethoxide, hydroxide or especially sodium hydride. The compounds mentioned under item (b) can be obtained by reducing compounds of Formula III, wherein X is oxo and Y is carboxy, with sodium borohydride, converting the resulting cyclic lactone into that of the corresponding hydroxamic acid with the use of hydroxylamine, hydrogenating the resulting compound with catalytically activated hydrogen to form the cyclic lactam, if desired reacting it, or its alkali metal salt, with a reactively esterified aliphatic, or cycloaliphatic araliphatic alcohol and reducing the N-unsubstituted or substituted lactame with a complex light metal hydride, e.g. lithium aluminum hydride. Finally, the compounds mentioned under item (c) can be prepared according to Netherlands application 6611324 (Chem. Abstr., 1967, 90587).

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinyl-pyrrolidone, if desired, (d) disintegrants, e.g. starches, agar, alginic acid or its sodium salt, enzymes, of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50%, of the active ingredient.

The following examples are intended to illustrate the invention and are not to be construed as being limitations thereon. Temperatures are given in degrees centigrade, and all parts wherever given are parts by weight.

EXAMPLE 1

The mixture of 3 g. 5-oxo-10-cyano-10,11-dihydro-5H-dibenzo[a,d]cycloheptene, 200 ml. ethyl acetate and 2 g. 10% palladium on charcoal is hydrogenated at 60° under an initial pressure of 3 at. for 3 hours. It is filtered, the filtrate evaporated in vacuo, the residue taken up in diethyl ether, the solution extracted with 5% hydrochloric acid, the extract made basic with aqueous sodium hydroxide and the mixture extracted with diethyl ether. The extract is washed with water, dried and evaporated, the residue taken up in ethanol, the solution acidified with ethanolic hydrochloric acid and the precipitate formed recrystallized from ethanol, to yield the 5-oxo-10-aminomethyl-10,11-dihydro-5H - dibenzo[a,d]cycloheptene hydrochloride of the formula

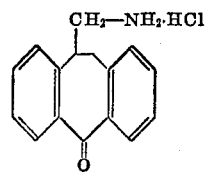

melting at 264–266°.

The starting material is prepared as follows: To the solution, prepared from 12.6 g. sodium and 400 ml. methanol, 64.5 g. phenylacetonitrile are added while stirring, followed by 50 ml. methanol. After 20 minutes 75 g. phthalaldehydic acid are added and the mixture refluxed for ½ hour. It is acidified with N-hydrochloric acid while chilled with ice and the whole poured into ice water. The precipitate formed is filtered off, washed with water, dried and recrystallized from ethyl acetate, to yield the α - (2 - carboxybenzylidene)-phenylacetonitrile melting at 178–180°.

The mixture of 11.1 g. thereof, 300 ml. ethyl acetate and 4 g. 10% palladium on charcoal is hydrogenated at 60° and an initial pressure of 3 at. for about 40 minutes. It is filtered, the filtrate evaporated and the residue recrystallized from diethyl ether, to yield the α-(2-carboxylbenzyl)-phenylacetonitrile melting at 121.5 to 124°.

To the solution of 21.5 g. thereof in 500 ml. methylene chloride, 21 g. phosphorous pentachloride are added portionwide during 20 minutes while swirling. After standing for 1½ hours at room temperature, it is chilled, washed with water, 2% aqueous sodium hydroxide and water, dried, filtered, evaporated and the residue triturated with petroleum ether, to yield the α-(2-chlorocarbonylbenzyl)-phenylacetonitrile melting at 85–87°.

To the solution of 69.5 g. thereof in 700 ml. 1,1,2,2-tetrachloroethane, 120 g. anhydrous aluminum chloride are added portionwise and the mixture heated at the steam cone for 2½ hours while swirling occasionally. After cooling, it is poured onto ice and concentrated hydrochloric acid and the mixture extracted with diethyl ether. The extract is washed with water, 2% aqueous sodium hydroxide and water, dried, filtered and evaporated. The residue is triturated with petroleum ether-diethyl ether and recrystallized from methanol, to yield 5-oxo-10-cyano - 10,11-dihydro-5H-dibenzo[a,d]cycloheptene, melting at 112–113°.

EXAMPLE 2

To the solution of 2.3 g. 10-carbamoyl-10,11-dihydro-5H-dibenzo[a,d]cycloheptene in 200 ml. tetrahydrofuran, 45 ml. of a 1 molar solution of boron hydride in tetrahydrofuran are added and the mixture refluxed for 3½ hours. After cooling, 200 ml. water and 20 ml. concentrated hydrochloric acid are added and the mixture concentrated to about half of its original volume. The concentrate is washed with diethyl ether, made basic with aqueous sodium hydroxide and extracted with diethyl ether. The extract is washed with water, dried and evaporated. The residue is taken up in ethanol, the solution acidified with ethanolic hydrochloric acid and the precipitate formed recrystallized from ethanol, to yield the 10-aminomethyl-10,11-dihydro - 5H - dibenzo[a,d]cycloheptene hydrochloride of the formula

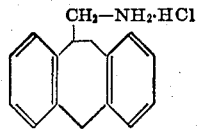

melting at 229–230°.

The starting material is prepared as follows: The mixture of 25 g. of 5-oxo-10-cyano-10,11-dihydro-5H-dibenzo[a,d]cycloheptene, 200 ml. glacial acetic acid and 300 ml. concentrated hydrochloric acid is refluxed for 3 hours and concentrated in vacuo. The concentrate is poured into ice water, the precipitate formed filtered off and taken up in 5% aqueous sodium bicarbonate. The solution is washed with diethyl ether, acidified with hydrochloric acid and extracted with diethyl ether. The extract is washed with water, dried, evaporated and the residue recrystallized from diethyl ether, to yield the 5-oxo-10-carboxy-10,11-dihydro - 5H - dibenzo[a,d]-cycloheptene melting at 144–145°.

The mixture of 15 g. thereof, 200 ml. glacial acetic acid and 5 g. 10% palladium on charcoal is hydrogenated at 70° under an initial pressure of 3 at. until the hydrogen uptake ceases. It is filtered, the filtrate evaporated in vacuo, the residue triturated with petroleum ether and recrystallized from petroleum ether-diethyl ether, to yield the 10-carboxy-10,11-dihydro - 5H - dibenzoic[a,d]cycloheptene melting at 120–121°.

The mixture of 6 g. thereof, 50 ml. thionyl chloride and a drop of dimethylformamide is refluxed for ½ hour, evaporated in vacuo, the residue taken up in benzene and again evaporated in vacuo, to yield the corresponding acid chloride. It is taken up in 100 ml. concentrated aqueous ammonia, the mixtures stirred for 1 hour, filtered, the residue washed with water, dried and recrystallized from methanol, to yield the 10-carbamoyl-10,11-dihydro-5H-dibenzo[a,d]cycloheptene melting at 188–189°.

EXAMPLE 3

To the solution of 2.8 g. 10-methylcarbamoyl-10,11-dihydro-5H-dibenzo[a,d]cycloheptene in 100 ml. tetrahydrofuran, 50 ml. of a 1 molar solution of boron hydride in tetrahydrofuran are added and the mixture refluxed for 3½ hours. After cooling, 50 ml. water, 50 ml. acetic acid and 10 ml. concentrated hydrochloric acid are added, the mixture refluxed for one hour, allowed to stand overnight and evaporated in vacuo. The residue is taken up in water, the mixture filtered, the filtrate made basic with aqueous sodium hydroxide, extracted with diethyl ether, the extract washed with water, dried, filtered and evaporated. The residue is taken up in ethanol, the solution acidified with ethanolic hydrochloric acid, the precipitate formed filtered off and recrystallized from ethanol, to yield the 10-methylaminomethyl-10,11-dihydro-5H-dibenzo[a,d]cycloheptene hydrochloride of the formula

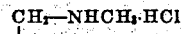

melting at 245–246° with decomposition.

The starting material is prepared as follows: To the solution of 3 g. 10-chlorocarbonyl-10,11-dihydro-5H-dibenzo[a,d]cycloheptene in the minimum amount of diethyl ether, 15 ml. 40% aqueous methylamine are added dropwise and the mixture stirred for one hour. It is diluted with 100 ml. water, filtered, the residue washed with water, dried and recrystallized from ethanol, to yield the 10 - methylcarbamoyl-10,11-dihydro-5H-dibenzo[a,d] cycloheptene melting at 190–191°.

EXAMPLE 4

The mixture of 3 g. 10-dimethylcarbamoyl-10,11-dihydro-5H-dibenzo[a,d]cycloheptene, 150 ml. tetrahydrofuran and 6 g. lithium aluminum hydride is refluxed for 6½ hours while stirring. After cooling, it is diluted with diethyl ether and 30 ml. water are added while stirring. It is filtered, the filtrate dried, evaporated and the residue recrystallized from diethyl ether, to yield the 10-dimethylaminomethyl-10,11-dihydro - 5H - dibenzo[a,d]cycloheptene of the formula

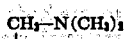

melting at 53.5 to 55°.

The starting material is prepared as follows: To 40 ml. anhydrous dimethylamine, 3.5 g. 10-chlorocarbonyl-10,11-dihydro-5H-dibenzo[a,d]cycloheptene in the minimum amount of tetrahydrofuran are added while stirring and the mixture is allowed to stand at room temperature until the excess dimethylamine is evaporated. The residue is triturated with water and diethyl ether and recrystallized from methanol, to yield the 10-dimethylcarbamoyl-10,11-dihydro - 5H - dibenzo[a,d]cycloheptene melting at 153–154°.

EXAMPLE 5

To the solution of 3.3 g. 10-diethylcarbamoyl-10,11-dihydro-5H-dibenzo[a,d]cycloheptene in 100 ml. tetrahydrofuran, 50 ml. of a 1 molar solution of boron hydride in tetrahydrofuran are added and the mixture refluxed for 3½ hours. After cooling, 50 ml. water are added dropwise and the mixture concentrated to about 25 ml. To the concentrate 50 ml. water, 50 ml. acetic acid and 10 ml. concentrated hydrochloric acid are added, the mixture refluxed for 1 hour, allowed to stand overnight and evaporated in vacuo. The residue is taken up in water, the mixture filtered, the filtrate made basic with aqueous sodium hydroxide and extracted with diethyl ether. The extract is shaken with 5% hydrochloric acid, the aqueous layer made basic with sodium hydroxide and again extracted with diethyl ether. The extract is washed with water, dried and evaporated. The residue is taken up in ethanol, the solution acidified with ethanolic hydrochloric acid and the precipitate formed recrystallized from ethanol, to yield the 10-diethylaminomethyl-10,11-dihydro-5H-dibenzo[a,d]cycloheptene hydrochloride of the formula

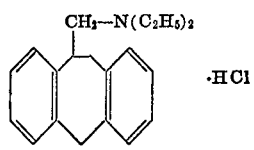

melting at 170–172°.

The starting material is prepared according to the method described in the previous examples; it shows in the I.R. spectrum a strong band at 6.13μ. Substituting it by:

(a) 2.7 g. 10-pyrrolidinocarbonyl-10,11-dihydro-5H-dibenzo[a,d]cycloheptene, M.P. 169–170° (ethanol);
(b) 3 g. 10-piperidinocarbonyl-10,11-dihydro-5H-dibenzo[a,d]cycloheptene, M.P. 157–158° (diethyl ether);
(c) 3.4 g. 10-hexamethyleneiminocarbonyl-10,11-dihydro-5H-dibenzo[a,d]cycloheptene, M.P. 144–146° (ethanol-diethyl ether);
(d) 8.0 g. 10-(4-benzylpiperazinocarbonyl)-10,11-dihydro-5H-dibenzo[a,d]cycloheptene, M.P. 241–243° (ethanol);
(e) 4.6 g. 10-(3-dimethylaminopropylcarbamoyl)-10,11-dihydro-5H-dibenzo[a,d]cycloheptene, M.P. 108–110° ethanol);
(f) 4.5 g. 10-(N-methyl-2-dimethylaminoethylcarbamoyl)-10,11-dihydro-5H-dibenzo[a,d]cycloheptene, M.P. hydrochloride hemihydrate, M.P. 190–192° (ethanol);
(g) 4.2 g. 10-(4-phenylpiperazinocarbonyl)-10,11-dihydro-5H-dibenzo[a,d]cycloheptene, M.P. 179–181° (ethanol);
(h) 4.7 g. 10-(4-phenylpiperidinocarbonyl)-10,11-dihydro-5H-dibenzo[a,d]cycloheptene, M.P. 162–164° (ethanol); or
(i) 6.0 g. 10-heptamethyleneiminocarbonyl-10,11-dihydro-5H-dibenzo[a,d]cycloheptene, M.P. 119–120° (ethanol), and following the procedure shown in the beginning, the following compounds are obtained:

(a) 10-pyrrolidinomethyl-10,11-dihydro-5H-dibenzo[a,d]cycloheptene hydrochloride, M.P. 235–237° (ethanol-diethyl ether);
(b) 10-piperidinomethyl-10,11-dihydro-5H-dibenzo[a,d]cycloheptene hydrochloride, M.P. 200–201° (ethanol-diethyl ether);
(c) 10-hexamethyleneiminomethyl-10,11-dihydro-5H-dibenzo[a,d]cycloheptene hydrochloride, M.P. 194–195° (ethanol-diethyl ether);
(d) 10-(4-benzylpiperazinomethyl)-10,11-dihydro-5H-dibenzo[a,d]cycloheptene dihydrochloride hemihydrate, M.P. 237–239° (ethanol);
(e) 10-(3-dimethylaminopropylaminomethyl)-10,11-dihydro-5H-dibenzo[a,d]cycloheptene dihydrochloride, M.P. 237–239° (ethanol);
(f) 10-(N - methyl-2-dimethylaminoethylaminomethyl)-10,11-dihydro-5H-dibenzo[a,d]cycloheptene, M.P. dipicrate, M.P. 213–215° (ethanol);
(g) 10-(4-phenylpiperazinomethyl)-10,11-dihydro-5H-dibenzo[a,d]cycloheptene dihydrochloride monohydrate, M.P. 225–228° (methanol-diethyl ether);
(h) 10-(4-phenylpiperidinomethyl)-10,11-dihydro-5H-dibenzo[a,d]cycloheptene hydrochloride, M.P. 252–255° (ethanol); and
(i) 10-heptamethyleneiminomethyl-10,11-dihydro-5H-dibenzo[a,d]cycloheptene, M.P. picrate 208 210° (ethanol).

EXAMPLE 6

The mixture of 3.5 g. 5-oxo-10-dimethylcarbamoyl-10,11-dihydro-5H-dibenzo[a,d]cycloheptene, 400 ml. diethyl ether and 7 g. lithium aluminum hydride is refluxed for 7 hours while stirring. After cooling, 35 ml. water are added dropwise during one hour, the mixture filtered, the filtrate dried and evaporated. The residue is taken up in the minimum amount of diethyl ether and, during several days, crystals separate, which are recrystallized from diethyl ether, to yield the higher melting isomer of the 5ξ-hydroxy-10 - dimethylaminomethyl-10,11-dihydro-5H-dibenzo[a,d]cycloheptene of the formula

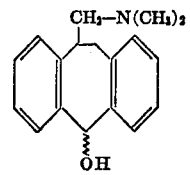

melting at 169–171°.

The combined mother liquors are allowed to stand in the refrigerator and the precipitate formed recrystallized from diethyl ether, to yield the other, lower melting isomer of the above formula, melting at 110–111½°.

The starting material is prepared as follows: The mixture of 7.5 g. 5-oxo-10-carboxy-10,11-dihydro-5H-dibenzo[a,d]cycloheptene, 100 ml. thionyl chloride and one drop dimethylformamide is refluxed for ½ hour and evaporated in vacuo at 100°. The residue is taken up in benzene, the mixture evaporated and the residue recrystallized from diethyl ether, to yield the 5-oxo-10-chlorocarbonyl-10,11-dihydro - 5H - dibenzo[a,d]cycloheptene melting at 108–110°.

4 g. thereof are added portionwise to 45 ml. anhydrous dimethylamine and the mixture allowed to evaporate overnight. The residue is taken up in water, the mixture extracted with diethyl ether, the extract washed with water, dried and evaporated, to yield the 5-oxo-10-dimethylcarbamoyl-10,11-dihydro - 5H - dibenzo[a,d]cycloheptene, which is used as such without further purification.

In the analogous manner, other 5-oxo-10-amides are prepared using an excess of the following reactants:

(a) concentrated aqueous ammonia→10-amide, M.P. 161–162° (ethanol-diethyl ether)
(b) saturated methylamine - benzene→10-methylamide, M.P. 212–213° (methanol)
(c) anhydrous diethylamine→10-diethylamide, M.P. 85–86° (diethyl ether)
(d) morpholine→10-morpholide, M.P. 147–148° (methanol-diethyl ether)
(e) 1-methyl-piperazino→10-(4-methylpiperazide), M.P. 128–129° (methanol-diethyl ether)

Hydrogenating the above starting materials in glacial acetic acid over palladium on charcoal at about 60–70°, the corresponding 5-desoxo-10-amides are obtained, which are identical with those described in Examples 2–5, 7 and 8.

EXAMPLE 7

To the solution of 3.7 g. 10-(4-methylpiperazinocarbonyl - 10,11 - dihydro-5H-dibenzo[a,d]cycloheptene in 100 ml. tetrahydrofuran, 50 ml. of a 1 molar solution of boron hydride in tetrahydrofuran are added and the mixture refluxed for 3½ hours. After cooling 100 ml. water, 100 ml. concentrated hydrochloric acid and 200 ml. glacial acetic acid are added while stirring, the mixture refluxed for 3 hours and allowed to stand for 3 days at room temperature. It is concentrated to about 200 ml., the concentrate combined with 200 ml. acetic acid and refluxed for 2 hours. It is evaporated in vacuo, the residue taken up in water, the solution filtered and the filtrate made basic with 10% aqueous sodium hydroxide. It is extracted with diethyl ether, the extract washed with water, dried, evaporated and the residue recrystallized from diethyl ether, to yield the 10-(4-methylpiperazinomethyl) - 10,11 - dihydro-5H-dibenzo[a,d]cycloheptene hemihydrate of the formula

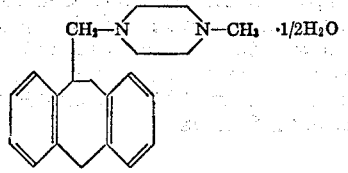

melting at 81–82°. Its dihydrochloride sesquihydrate is prepared from ethanolic hydrogen chloride and melts, after drying at 80° *in vacuo*, at 242–244°.

The starting material is prepared as follows: To the solution of 10-chlorocarbonyl-10,11-dihydro-5H-dibenzo[a,d]cyclo-heptene in the minimum amount of diethyl ether, 12 ml. 1-methyl-piperazine are added portionwise while stirring. After one hour, 5 ml. water are added and the ether evaporated at the steam cone. The suspension is filtered, the residue washed with water and recrystallized from ethanol, to yield the 10-(4-methyl-piperazino-carbonyl) - 10,11 - dihydro-5H-dibenzo[a,d]cycloheptene melting at 163–164°.

EXAMPLE 8

The mixture of 6 g. of 5-oxo-10-(4-methylpiperazino-carbonyl) - 10,11-dihydro-5H-dibenzo[a,d]cycloheptene, 300 ml. tetrahydrofuran and 15 g. lithium aluminum hydride is refluxed for 3 hours while stirring. After cooling, it is diluted with 400 ml. diethyl ether and 65 ml. water are added during 1 hour. It is filtered, the filtrate dried, evaporated and the residue recrystallized from methanol, to yield the 5-hydroxy-10-(4-methylpiperazinomethyl) - 10,11-dihydro-5H-dibenzo[a,d]cycloheptene of the formula

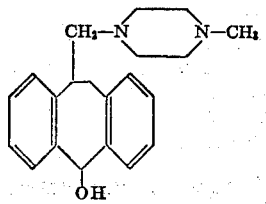

melting at 235–237°.

EXAMPLE 9

To the solution of 3 g. 10-[4-(2-hydroxyethyl)-piperazinocarbonyl]-10,11-dihydro-5H - dibenzo[a,d]cycloheptene and 100 ml. tetrahydrofuran, 50 ml. of 1 molar boron hydride in tetrahydrofuran are added while stirring, and the mixture refluxed for 3½ hours. It is cooled and ice is added until the hydrogen evolution ceases. After the addition of 20 ml. water and 20 ml. acetic acid, the mixture is evaporated at the steam cone, the residue taken up in 80 ml. water, 50 ml. acetic acid and 20 ml. concentrated hydrochloric acid, the mixture refluxed for ½ hour and evaporated *in vacuo*. The residue is taken up in water, the solution filtered, the filtrate made basic with 10% aqueous sodium hydroxide and extracted with diethyl ether. The extract is washed with water, dried, evaporated and the residue taken up in ethanolic hydrogen chloride. The precipitate formed is filtered off, washed with diethyl ether and recrystallized from ethanol-acetone, to yield the 10-[4-(2-hydroxyethyl)-piperazinomethyl]-10,11-dihydro - 5H - dibenzo[a,d]cycloheptene dihydrochloride of the formula

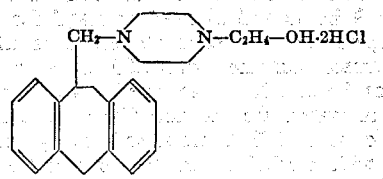

melting at 230–235°. The dipicrate of the free base melts at 245–250° with decomposition (methanol).

The starting material is prepared as follows: To the mixture of 6.5 g. 10-chlorocarbonyl-10,11-dihydro-5H-dibenzo[a,d]cycloheptene in 150 ml. diethyl ether, 12 ml. 1-(2-hydroxyethyl)-piperazine are added dropwise while stirring and the mixture allowed to stand for 1 hour at room temperature. It is evaporated on the steam bath, the residue poured onto ice water, the supernatant phase decanted off and the residue washed with water. It is taken up in 25 ml. ethanol, the solution diluted with water until it becomes cloudy and allowed to stand in the refrigerator. The precipitate formed is filtered off, washed with water and recrystallized from ethanol-diethyl ether, to yield the 10-[4-(2-hydroxyethyl)-piperazinocarbonyl-10,11-dihydro - 5H - dibenzo[a,d]cycloheptene melting at 116–118°.

EXAMPLE 10

To the solution of 2.5 g. 10-morpholinocarbonyl-10,11-dihydro-5H-dibenzo[a,d]cycloheptene in 100 ml. tetrahydrofuran, 50 ml. of a 1 molar solution of boron hydride in tetrahydrofuran are added and the mixture refluxed for 3½ hours. After cooling, 50 ml. water are added dropwise, followed by 5 ml. acetic acid and the mixture concentrated to about 25 ml. The concentrate is combined with 50 ml. water, 50 ml. acetic acid and 10 ml. concentrated hydrochloric acid, refluxed for 1 hour, allowed to stand overnight and evaporated *in vacuo*. The residue is taken up in water, the solution filtered, the filtrate made basic with 10% aqueous sodium hydroxide and extracted with diethyl ether. The extract is washed with water, dried, evaporated, the residue taken up in ethanolic hydrogen chloride, the precipitate taken up in water, the solution made basic and extracted again with diethyl ether. The extract is washed with water, dried and evaporated, to yield the 10-morpholinomethyl-10,11-dihydro-5H-dibenzo[a,d]cycloheptene of the formula

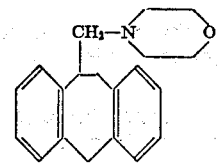

melting at 128–130°.

EXAMPLE 11

To the solution of 2.2 g. 10-(2-dimethylaminoethylcarbamoyl) - 10,11 - dihydro-5H-dibenzo[a,d]cycloheptene in 50 ml. tetrahydrofuran, 75 ml. of a 1 molar solution of boron hydride in tetrahydrofuran are added and the mixture refluxed for 3½ hours. After cooling, 20 ml. water, 10 ml. acetic acid and 5 ml. concentrated hydrochloric acid are added and the mixture concentrated to about 50 ml. Hereupon 80 ml. water, 30 ml. acetic acid and 30 ml. concentrated hydrochloric acid are added, the mixture refluxed for 4 hours and evaporated *in vacuo*. The residue is taken up in water, the mixture filtered, the filtrate made basic with 2 N aqueous sodium hydroxide and extracted with diethyl ether. The extract is washed with water, dried and evaporated, to yield the oily 10-(2-dimethylaminoethylaminomethyl) - 10,11 - dihydro-5H-dibenzo[a,d]cycloheptene of the formula

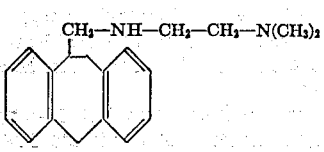

The dipicrate thereof, prepared in ethanol, melts at 213–214° (methanol) with decomposition.

The starting material is prepared as shown in the previous examples; it melts at 138–139° (ethanol-diethyl ether).

EXAMPLE 12

To the solution of 3.4 g. 7-methyl-10-(4-methylpiperazinocarbonyl) - 10,11 - dihydro-5H-dibenzo[a,d]cycloheptene in 100 ml. tetrahydrofuran, 50 ml. of a 1 molar solution of boron hydride in tetrahydrofuran are added, and the mixture refluxed for 3½ hours. After cooling, 50 ml. water and 30 ml. concentrated hydrochloric acid are added and the mixture concentrated on the steam cone. The concentrate is diluted with 70 ml. concentrated hydrochloric acid and 100 ml. acetic acid, refluxed for 5½ hours and evaporated *in vacuo*. The residue is taken up in water, the solution filtered, the filtrate made basic with 2 N aqueous sodium hydroxide and extracted with diethyl ether. The extract is washed with water, dried, evaporated and the residue recrystallized from diethyl ether, to yield the 7-methyl-10-(4-methylpiperazinomethyl)-10,11-dihydro-5H-dibenzo[a,d]cycloheptene of the formula

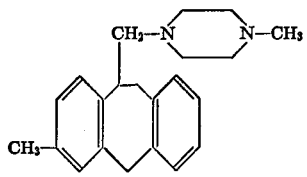

melting at 117–118.5°.

The starting material is prepared analogous to the method described in Examples 1, 2 and 9. The respective intermediates have the following melting points (if not otherwise stated, the same solvent for recrystallization is used):

(a) α-(2-carboxybenzylidene)-4-methyl-phenylacetonitrile, 191–193°;
(b) α-(2-carboxybenzyl)-4-methyl-phenylacetonitrile, 125.5–127.5°;
(c) α-(2-chlorocarbonylbenzyl)-4-methyl-phenylacetonitrile, 70–72° (diethyl ether-ethyl acetate);
(d) 5-oxo-7-methyl-10-cyano-10,11-dihydro-5H-dibenzo[a,d]cycloheptene, 119–120° (diethyl ether-ethyl acetate);
(e) 5-oxo-7-methyl-10-carboxy-10,11-dihydro-5H-dibenzo[a,d]cycloheptene, 166–168°;
(f) 7-methyl-10-carboxy-10,11-dihydro-5H-dibenzo[a,d]cycloheptene, 153–155° (methanol);
(g) 7-methyl-10-(4-methylpiperazinocarbonyl)-10,11-dihydro-5H-dibenzo[a,d]cycloheptene, 142–144° (diethyl ether).

Substituting the above starting material by:

(a) 6.0 g. 7-methyl-10-hexamethyleneiminocarbonyl-10,11-dihydro-5H-dibenzo[a,d]cycloheptene, M.P. 109–111° (ethanol);
(b) 5.7 g. 7-methyl-10-dimethylcarbamoyl-10,11-dihydro-5H-dibenzo[a,d]cycloheptene; or
(c) 5.8 g. 7-methyl-10-diethylcarbamoyl-10,11-dihydro-5H-dibenzo[a,d]cycloheptene, and following the procedure shown in the beginning, the following compounds are obtained:

(a) 7-methyl-10-hexamethyleneiminomethyl-10,11-dihydro-5H-dibenzo[a,d]cycloheptene hydrochloride, M.P. 183–186° (ethanol-diethyl ether);
(b) 7-methyl-10-dimethylaminomethyl-10,11-dihydro-5H-dibenzo[a,d]cycloheptene hydrochloride, M.P. 211–213° (ethanol-diethyl ether); and
(c) 7-methyl-10-diethylaminomethyl-10,11-dihydro-5H-dibenzo[a,d]cycloheptene hydrochloride, M.P. 164–166° (ethanol-diethyl ether).

EXAMPLE 13

The solution of 2 g. 5,10-(iminomethano)-10,11-dihydro-5H-dibenzo[a,d]cycloheptene hydrochloride in 100 ml. of ethanol is hydrogenated over 0.5 g. palladium on charcoal at 80° and 3 at. After the absorption of the theoretical amount of hydrogen, the mixture is filtered, the filtrate evaporated and the residue recrystallized from ethanol, to yield the 10-aminomethyl-10,11-dihydro-5H-dibenzo[a,d]cycloheptene hydrochloride melting at 229–230°; it is identical with that obtained according to Example 2.

The starting material is prepared as follows: To the solution of 20.7 g. 5-oxo-10-carboxy-10,11-dihydro-5H-dibenzo[a,d]cycloheptene in 300 ml. methanol, 30 g. sodium borohydride are added portionwise while stirring, the mixture heated on the steam cone for ½ hour and slowly evaporated. The residue is taken up in 300 ml. water, the mixture filtered and the filtrate acidified with hydrochloric acid. The precipitate formed is filtered off, washed with water, dried and recrystallized from diethyl ether, to yield the cyclic lactone of the 5-hydroxy-10-carboxy-10,11-dihydro-5H-dibenzo[a,d]cycloheptene melting at 152–153°.

5.25 g. thereof are added portionwise to the filtered mixture, prepared from 35 g. hydroxylamine hydrochloride, 20 ml. water, 120 ml. ethylene glycol and 14 g. sodium hydroxide at 0°. The mixture is refluxed for 13 hours and allowed to stand at the steam cone for 4 days. It is diluted with water, filtered, the residue washed with water and recrystallized from diethyl ether, to yield the corresponding cyclic hydroxamic acid lactone of the formula

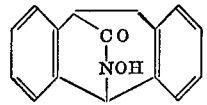

melting at 237–239°.

19.5 g. thereof are hydrogenated in 1.8 liters ethanol over 10 g. Raney nickel at 70° and 3.4 at. for 80 minutes and filtered hot. The catalyst is washed with hot ethanol, the filtrate evaporated and the residue recrystallized from ethanol-diethyl ether, to yield the corresponding cyclic lactam melting at 226–228°.

The mixture of 5.6 g. thereof, 12 g. lithium aluminum hydride and 500 ml. tetrahydrofuran is refluxed for 5¾ hours while stirring and allowed to stand overnight at room temperature. It is diluted with diethyl ether, 60 ml. water are added dropwise during 1 hour while stirring and filtered. The filtrate is dried, evaporated, the residue taken up in ethanol, the solution acidified with ethanolic hydrogen chloride and the precipitate recrystallized from ethanol-diethyl ether, to yield the 5,10-(iminomethano)-10,11-dihydro-5H-dibenzo[a,d]cycloheptene hydrochloride of the formula

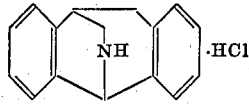

melting at 272–274° with decomposition.

EXAMPLE 14

2 g. N-methyl-5,10-(iminomethano)-10,11-dihydro-5H-dibenzo[a,d]cycloheptene hydrochloride are hydrogenated in 100 ml. ethanol over 0.5 g. palladium on charcoal at 3.4 at. and 80°. After 2 hours, the mixture is filtered hot, the filtrate evaporated and the residue recrystallized from ethanol, to yield the 10-methylaminomethyl-10,11-dihydro-5H-dibenzo[a,d]cycloheptene hydrochloride melting at 245–246° with decomposition; it is identical with that obtained according to Example 3.

The starting material is prepared as follows: To the solution of 5.5 g. of the cyclic lactam of the 5-amino-10-carboxy - 10,11 - dihydro-5H-dibenzo[a,d]cycloheptene in 400 ml. toluene, 1.15 g. 56% sodium hydride in mineral oil are added and the mixture stirred on the steam cone until the hydrogen evolution ceases. Hereupon 50 ml. methyl iodide are added and the mixture refluxed for 3¼ hours while stirring. After cooling, it is diluted with diethyl ether, washed with water, dried, evaporated and the residue recrystallized from methanol, to yield the corresponding N-methyllactam.

The mixture of 5.6 g. thereof, 12 g. lithium aluminum hydride and 500 ml. tetrahydrofuran is refluxed for 6 hours while stirring. After cooling, 60 ml. water are added during 1 hour, the mixture filtered, the filtrate dried, evaporated, the residue taken up in ethanol, the solution acidified with ethanolic hydrogen chloride and the precipitate formed recrystallized from ethanol-diethyl ether, to yield the N-methyl-5,10-(iminomethano)-10,11-dihydro-5H-dibenzo[a,d]cycloheptene hydrochloride melting at 251-253°.

EXAMPLE 15

Preparation of 10,000 tablets each containing 100.0 mg. of the active ingredient:

Formula:

|  | G. |
|---|---|
| 10 - (4 - methylpiperazinomethyl)-10,11-dihydro - 5H - dibenzo[a,d]cycloheptene dihydrochloride sesquihydrate | 1,000.00 |
| Lactose | 2,535.00 |
| Corn starch | 125.00 |
| Polyethylene glycol 6,000 | 150.00 |
| Talcum powder | 150.00 |
| Magnesium stearate | 40.00 |
| Purified water, q.s. |  |

Procedure

All the powders are passed through a screen with openings of 0.6 mm. Then the 10-(4-methylpiperazinomethyl) - 10,11 - dihydro - 5H-dibenzo[a,d]cycloheptene dihydrochloride sesquihydrate, lactose, talcum, magnesium stearate and half of the starch are mixed in a suitable mixer. The other half of the starch is suspended in 65 ml. water and the suspension added to the boiling solution of the polyethylene glycol in 260 ml. water. The paste formed is added to the powders which are granulated, if necessary, with an additional amount of water. The granulate is dried overnight at 35°, broken on a screen with 1.2 mm. openings and compressed into tablets using concave punches with 10.3 mm. diameter, uppers bisected.

EXAMPLE 16

To the solution of 4.6 g. 7-methyl-10-piperidinocarbonyl-10,11-dihydro-5H-dibenzo[a,d]cycloheptene in 400 ml. tetrahydrofuran, 5 g. lithium aluminum hydride are added and the mixture refluxed for 5 hours while stirring. After cooling, 25 ml. water are added, the mixture filtered, the filtrate dried and evaporated. The residue is taken up in ethanol, the solution acidified with ethanolic hydrogen chloride and diluted with diethyl ether, to yield the 7 - methyl - 10 - piperidinomethyl-10,11-dihydro-5H-dibenzo[a,d]cycloheptene hydrochloride of the formula

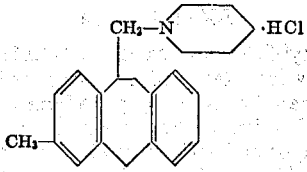

melting at 285-287° with decomposition.

The starting material is prepared as described in the previous examples. It melts at 131-133° (ethanol).

EXAMPLE 17

To the solution of 3.7 g. 10-cyclopropylcarbamoyl-10,11-dihydro-5H-dibenzo[a,d]cycloheptene, 6 g. lithium aluminum hydride are added portionwise and the mixture refluxed for 5 hours while stirring. After cooling, 25 ml. water are added dropwise, the mixture filtered, the filtrate dried and evaporated, to yield the 10-cyclopropylamino-methyl-10,11-dihydro-5H-dibenzo[a,d]cycloheptene of the formula

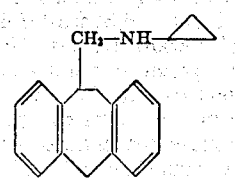

showing in the I.R. spectrum a strong band at 2.98μ.

The starting material is prepared as shown in the previous examples. It melts at 202-204.5° (diethyl ether).

EXAMPLE 18

To the mixture of 5 g. lithium aluminum hydride and 200 ml. tetrahydrofuran, the solution of 5.5 g. 10-(N-methyl-N-benzylcarbamoyl) - 10,11-dihydro-5H-dibenzo[a,d]cycloheptene in 200 ml. tetrahydrofuran is slowly added while stirring and the mixture refluxed for 4 hours. After standing overnight, 25 ml. water are added during 1 hour, the mixture filtered, the filtrate dried, evaporated and the residue recrystallized from diethyl ether, to yield the 10 - (N-methyl-N-benzylaminomethyl) - 10,11-dihydro-5H-dibenzo[a,d]cycloheptene of the formula

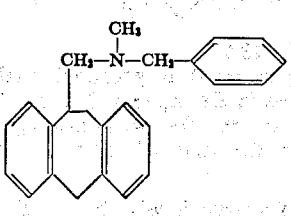

melting at 188-190°.

The corresponding hydrochloride melts at 202-205° (ethanol) with decomposition and the starting material at 122-123.5° (diethyl ether-petroleum ether).

EXAMPLE 19

To the solution of 5.5 g. 10-methyl-10-(4-methylpiperazinocarbonyl) - 10,11 - dihydro - 5H-dibenzo[a,d]cycloheptene in 100 ml. tetrahydrofuran are added 50 ml. of a 1 molar solution of boron hydride in tetrahydrofuran and the mixture refluxed for 4 hours. After cooling, 50 ml. water and 30 ml. concentrated hydrochloric acid are added and the mixture concentrated to about 80 ml. Hereupon 70 ml. concentrated hydrochloric acid and 150 ml. glacial acetic acid are added, the mixture refluxed for 6 hours and evaporated in vacuo. The residue is taken up in water, the mixture filtered, the filtrate made basic with potassium carbonate and extracted with diethyl ether. The extract is washed with water, dried and evaporated, to yield the oily 10-methyl-10-(4-methylpiperazinomethyl)-10,11-dihydro-5H-dibenzo[a,d]cycloheptene of the formula

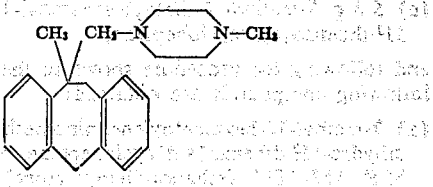

The dihydrochloride thereof, prepared in diethyl ether with ethanolic hydrogen chloride, melts at 256-258° (ethanol) with decomposition.

The starting material is prepared as follows: The solution of 15 g. 5 - oxo - 10 - cyano-10,11-dihydro-5H-dibenzo[a,d]cycloheptene in 75 ml. dimethylformamide is added to the suspension of 3 g. 57% sodium hydride-mineral oil preparation and 25 ml. dimethylformamide. 40 ml. methyl iodide are added dropwise to the above mixture and the resulting mixture allowed to stand for 1½ hours, then heated on a steam cone. Upon cooling, the mixture is treated with ice and water and extracted with diethyl ether. The extract is washed with water, dried and evaporated to give the crude 5-oxo-10-methyl-10-cyano-10,11-dihydro-5H-dibenzo[a,d]cycloheptene.

The solution of 15 g. thereof in 150 ml. glacial acetic acid and 200 ml. concentrated hydrochloric acid is refluxed for 3½ hours and evaporated in vacuo. The concentrate is diluted with ice and water and extracted with diethyl ether. The extract is washed with water, dried and evaporated. The residue is made crystalline with diethyl ether. Recrystallization from diethyl ether affords the 5-oxo-10-methyl - 10-carboxy-10,11-dihydro-5H-dibenzo[a,d]cycloheptene, melting at 142–144°.

16.5 g. thereof is hydrogenated in 150 ml. glacial acetic acid with 6 g. 10% palladium on charcoal under 3 atm. hydrogen at 70° for 3 hours. The catalyst is filtered off and the filtrate evaporated in vacuo. The residue is crystallized from petroleum ether, yielding the 10-methyl-10-carboxy-10,11-dihydro - 5H - dibenzo[a,d]cycloheptene, M.P. 169–171°.

The mixture of 5 g. thereof, 50 ml. thionyl chloride and 2–3 drops of dimethyl formamide is refluxed for ½ hour and evaporated in vacuo. The residue is taken up in benzene and evaporated once more in vacuo. The crude acid chloride obtained is dissolved in 100 ml. diethyl ether and treated with 10 ml. N-methylpiperazine, added portionwise. The mixture is allowed to stand for 1 hour and then diluted with water. The layers are separated and the aqueous layer extracted with diethyl ether. The combined ether layers are washed with water, dried and evaporated. The residue is recrystallized from diethyl ether-petroleum ether, to give the 10-methyl-10-(4-methylpiperazinocarbonyl)-10,11-dihydro - 5H - dibenzo[a,d]cycloheptene, M.P. 124–126°.

In an analogous manner, the following amides are prepared:

(a) 10-methyl-10-hexamethyleneiminocarbonyl-10,11-dihydro-5H-dibenzo[a,d]cycloheptene, M.P. 116–118° (ethanol);
(b) 10-methyl-10-diethylcarbamoyl-10,11-dihydro-5H-dibenzo[a,d]cycloheptene, M.P. 84–87° (diethyl ether);
(c) 10-methyl-10-piperidinocarbonyl-10,11-dihydro-5H-dibenzo[a,d]cycloheptene, M.P. 116–119° (diethyl ether);
(d) 10-methyl-10-dimethylcarbamyl-10,11-dihydro-5H-dibenzo[a,d]cycloheptene, M.P. 125–127° (ethanol); and
(e) 10-methyl-10-methylcarbamoyl-10,11-dihydro-5H-dibenzo[a,d]cycloheptene, M.P. 190–192° (ethanol), which on reduction with borane as described above afford the following compounds:

(a) 10-methyl-10-hexamethyleneiminomethyl-10,11-dihydro-5H-dibenzo[a,d]cycloheptene hydrochloride, M.P. 243–246° with decomposition (ethanol);
(b) 10-methyl-10-diethylaminomethyl-10,11-dihydro-5H-dibenzo[a,d]cycloheptene hydrochloride, M.P. 262–263° with decomposition (ethanol);
(c) 10-methyl-10-piperidinomethyl-10,11-dihydro-5H-dibenzo[a,d]cycloheptene hydrochloride, M.P. 277–280° with decomposition (ethanol);
(d) 10-methyl-10-dimethylaminomethyl-10,11-dihydro-5H-dibenzo[a,d]cycloheptene hydrochloride, M.P. 276–278° with decomposition (ethanol); and
(e) 10-methyl-10-methylaminomethyl-10,11-dihydro-5H-dibenzo[a,d]cycloheptene hydrochloride, M.P. 282–284° with decomposition (ethanol).

EXAMPLE 20

2.0 g. 10-p-toluenesulfonyloxymethyl-10,11-dihydro-5H-dibenzo[a,d]cycloheptene are heated with 10 ml. piperidine on a steam cone for 2 hours. The mixture is evaporated in vacuo, diluted with water and extracted with diethyl ether. The extract is washed with water, dried and evaporated. The residue is taken up in ether and treated with ethanolic hydrogen chloride, to afford the 10-piperidinomethyl-10,11-dihydro-5H - dibenzo[a,d]cycloheptene hydrochloride, melting at 200–201° (ethanol-diethyl ether); it is identical with that obtained according to Example 5(b).

The starting material is prepared as follows: To the solution of 20 g. 10-carboxy-10,11-dihydro-5H-dibenzo[a,d]cycloheptene in 100 ml. tetrahydrofuran is added dropwise to 150 ml. of a 1 molar solution of borane in tetrahydrofuran. The resulting mixture is refluxed for 5 hours, cooled, treated with water, made basic with 10% aqueous sodium hydroxide and further treated with 100 ml. 30% aqueous hydrogen peroxide. The mixture is stirred for 2 hours and the tetrahydrofuran distilled off. The aqueous mixture is extracted with diethyl ether and the extract washed with water, dried and evaporated, to give the 10-hydroxymethyl-10,11-dihydro-5H-dibenzo[a,d]cycloheptene.

To the solution of 8.6 g. thereof in 75 ml. pyridine is added 15.3 g. p-toluenesulfonyl chloride at 0°. The mixture is allowed to stand for 3 days and then treated with 1 liter of ice and water. The mixture is extracted with diethyl ether and the extract is washed successively with water, 10% hydrochloric acid and water, dried and evaporated, to afford the 10-p-toluenesulfonyloxymethyl-10,11-dihydro-5H-dibenzo[a,d]cycloheptene, M.P. 124–126° (diethyl ether).

EXAMPLE 21

1.4 g. 10-piperidinomethyl-5H-dibenzo[a,d]cycloheptene is hydrogenated in 120 ml. glacial acetic acid with 0.5 g. 10% palladium on charcoal under about 3 atm. of hydrogen at 70° for 7 hours. The catalyst is filtered off and the filtrate evaporated in vacuo. The residue is taken up in water, made basic with 10% aqueous sodium hydroxide and extracted with diethyl ether. The extract is washed with water and extracted in turn with 6 N hydrochloric acid. The organic layer is discarded and the aqueous acid extract is made basic with 10% aqueous sodium hydroxide and then extracted with diethyl ether. The extract is washed, dried and evaporated. The residue is taken up in diethyl ether and treated with ethanolic hydrogen chloride. The salt formed is collected on a filter and recrystallized from ethanol-diethyl ether, to give the 10-piperidinomethyl-10,11-dihydro - 5H - dibenzo[a,d]cycloheptene hydrochloride, melting at 200–201°; it is identical with that obtained according to Examples 5(b) and 20.

EXAMPLE 22

To the solution of 5.2 g. 10-(4-carboethoxy-piperazinocarbonyl)-10,11-dihydro-5H-dibenzo[a,d]cycloheptene in 100 ml. tetrahydrofuran are added, 65 ml. of a 1 molar solution of boron hydride in tetrahydrofuran and the mixture refluxed for 4 hours. After cooling, 50 ml. water, 200 ml. glacial acetic acid and 150 ml. concentrated hydrochloric acid are added, and the mixture is concentrated to a volume of about 400 ml. The mixture is then refluxed for 7 hours and evaporated in vacuo. The residue is taken up in water, filtered and the filtrate made basic with potassium carbonate. The basic mixture is extracted with diethyl ether and the extract washed, dried and evaporated, to yield the 10-piperazinomethyl-10,11-dihydro-5H-dibenzo[a,d]cycloheptene of the formula

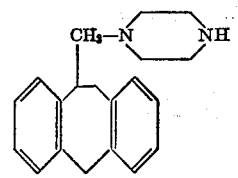

the dipicrate thereof melts at 253–254° (ethanol).

The starting material is prepared as follows: The mixture of 4 g. 10 - carboxy-10,11-dihydro-5H-dibenzo[a,d]cycloheptene, 50 ml. thionyl chloride and 2–3 drops of dimethylformamide is refluxed for ½ hour and evaporated *in vacuo*. The residue is taken up in benzene and evaporated once more. The crude acid chloride obtained is dissolved in 100 ml. diethyl ether and treated with 12 ml. N-carboethoxypiperazine, added in portions. The mixture is allowed to stand for 1 hour and then diluted with water. The layers are separated and the aqueous layer extracted with diethyl ether. The combined ether layers are washed with water, dried and evaporated. The solid residue is recrystallized from diethyl ether, to afford the 10-(4-carboethoxypiperazinocarbonyl) - 10,11-dihydro-5H-dibenzo[a,d]cycloheptene, melting at 119–121°.

EXAMPLE 23

3.1 g. 10 - (4-benzylpiperazinomethyl)-10,11-dihydro-5H-dibenzo[a,d]cycloheptene dihydrochloride, described in Example 5(d), is dissolved in 150 ml. ethanol and treated with 3 g. 10% palladium on carbon under about 3 atm. of hydrogen at 55–60° for 2½ hours. After cooling, the catalyst is filtered off and the filtrate evaporated, to give the 10-piperazinomethyl-10,11-dihydro-5H-dibenzo[a,d]cycloheptene dihydrochloride monohydrate, M.P. 262–264° (ethanol); it has the same structural formula as that shown in Example 22.

What is claimed is:

1. A compound having the formula

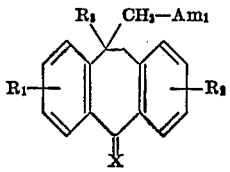

wherein each of $R_1$ and $R_2$ is hydrogen, methyl, methoxy, chloro, trifluoromethyl, nitro or amino, $R_3$ is hydrogen or methyl, $Am_1$ is pyrrolidino, piperidino, 4-phenyl-piperidino, hexamethyleneimino, piperazino, morpholino or 4-(methyl, ethyl or 2-hydroxyethyl)-piperazino and X represents two hydrogen atoms, or therapeutically acceptable acid addition salts thereof.

2. A compound as claimed in claim 1 and being the 10-piperidinomethyl - 10,11 - dihydro-5H-dibenzo[a,d]cycloheptene or a therapeutically useful acid addition salt thereof.

3. A compound as claimed in claim 1 and being the 10-morpholinomethyl-10,11-dihydro-5H-dibenzo[a,d]cycloheptene or a therapeutically useful acid addition salt thereof.

4. A compound as claimed in claim 1 and being the 10-(4 - methylpiperazinomethyl) - 10,11-dihydro-5H-dibenzo[a,d]cycloheptene or a therapeutically useful acid addition salt thereof.

5. A compound as claimed in claim 1 and being the 10-(4 - phenylpiperidinomethyl) 10,11 - dihydro-5H-dibenzo[a,d]cycloheptene or a therapeutically useful acid addition salt.

References Cited

UNITED STATES PATENTS

| | | | |
|---|---|---|---|
| 3,480,624 | 11/1969 | Fouche | 260—240 |
| 3,562,331 | 2/1971 | Schulenberg et al. | 260—570.7 |
| 3,567,730 | 3/1971 | Fouche | 260—268 |
| 3,627,832 | 4/1967 | Schulenberg et al. | 260—268 TR |
| 3,631,103 | 12/1971 | Rey-Bellet et al. | 260—559 R |

NICHOLAS S. RIZZO, Primary Examiner

J. TOVAR, Assistant Examiner

U.S. Cl. X.R.

260—239 B, 247.5 R, 247.7 C, 247.7 H, 268 TR, 268 C 293.62, 326.5 C, 326.81; 424—248